(12) United States Patent
Katayama et al.

(10) Patent No.: US 8,530,084 B2
(45) Date of Patent: Sep. 10, 2013

(54) ELECTRODE STRUCTURE FOR NON-AQUEOUS ELECTROLYTE SECONDARY BATTERY, METHOD FOR PRODUCING THE SAME, AND NON-AQUEOUS ELECTROLYTE SECONDARY BATTERY

(75) Inventors: Hitoshi Katayama, Osaka (JP); Takashi Nonoshita, Osaka (JP); Takeshi Kasamatsu, Osaka (JP); Shoichi Imashiku, Osaka (JP); Seiichi Kato, Osaka (JP); Masanori Sumihara, Osaka (JP)

(73) Assignee: Panasonic Corporation, Osaka (JP)

( * ) Notice: Subject to any disclaimer, the term of this patent is extended or adjusted under 35 U.S.C. 154(b) by 210 days.

(21) Appl. No.: 12/811,487

(22) PCT Filed: Jun. 24, 2009

(86) PCT No.: PCT/JP2009/002889
§ 371 (c)(1),
(2), (4) Date: Jul. 1, 2010

(87) PCT Pub. No.: WO2009/157192
PCT Pub. Date: Dec. 30, 2009

(65) Prior Publication Data
US 2010/0285353 A1    Nov. 11, 2010

(30) Foreign Application Priority Data

Jun. 25, 2008   (JP) .................................. 2008-165562
Jun. 25, 2008   (JP) .................................. 2008-165563
Jul. 28, 2008   (JP) .................................. 2008-192979
Dec. 2, 2008    (JP) .................................. 2008-307173

(51) Int. Cl.
*H01M 4/02*    (2006.01)

(52) U.S. Cl.
USPC ............ 429/211; 429/161; 429/209; 429/238

(58) Field of Classification Search
USPC .................................. 429/161, 238, 209, 211
See application file for complete search history.

(56) References Cited

U.S. PATENT DOCUMENTS

| 6,447,950 | B1 * | 9/2002 | Iijima ............................ 429/209 |
| 2003/0062259 | A1 * | 4/2003 | Mushiake et al. ........ 204/290.01 |
| 2003/0224242 | A1 * | 12/2003 | Kaito et al. ..................... 429/94 |

(Continued)

FOREIGN PATENT DOCUMENTS

| JP | 01-265452 | 10/1989 |
| JP | 05-062666 | 3/1992 |

(Continued)

OTHER PUBLICATIONS

JP 2007214086 A machine English translation.*

*Primary Examiner* — Ula C Ruddock
*Assistant Examiner* — Scott J Chmielecki
(74) *Attorney, Agent, or Firm* — McDermott Will & Emery LLP

(57) ABSTRACT

An electrode 13 has an active material layer 12 formed on each of two whole main surfaces of a current collector 11. A part of an electrode lead 14 overlaps the electrode 13. One end face of the electrode 13 in the width direction of the electrode 13 is flush with one end face of the electrode lead 14. Joints 15 are formed at the one end of the electrode 13 in the width direction. The joints 15 join the electrode 13 and the electrode lead 14 so as to provide electrical continuity between the exposed part of the current collector 11 at the one end face of the electrode 13 in the width direction and the electrode lead 14. The joints 15 are formed, for example, by plasma welding.

7 Claims, 10 Drawing Sheets

(56) References Cited

U.S. PATENT DOCUMENTS

2006/0008698 A1 1/2006 Kim et al.
2007/0072087 A1* 3/2007 Yamamoto et al. ........... 429/344
2008/0206640 A1 8/2008 Shibata et al.

FOREIGN PATENT DOCUMENTS

| | | |
|---|---|---|
| JP | 05-013064 | 1/1993 |
| JP | 2000-090994 | 3/2000 |
| JP | 2001-052679 | 2/2001 |
| JP | 2004-311282 A | 11/2004 |
| JP | 2007-141864 | 6/2007 |
| JP | 2007-214086 | 8/2007 |
| JP | 2007214086 A * | 8/2007 |
| JP | 2008-210617 | 9/2008 |
| KR | 2006-0045625 A | 5/2006 |

* cited by examiner

F I G. 2 9 PRIOR ART
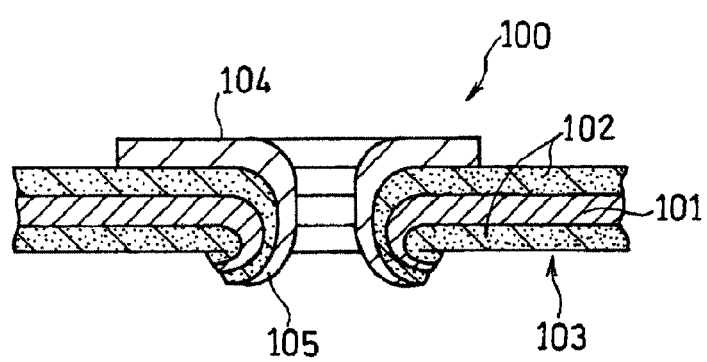

ELECTRODE STRUCTURE FOR NON-AQUEOUS ELECTROLYTE SECONDARY BATTERY, METHOD FOR PRODUCING THE SAME, AND NON-AQUEOUS ELECTROLYTE SECONDARY BATTERY

RELATED APPLICATIONS

This application is the U.S. National Phase under 35 U.S.C. §371 of International Application No. PCT/JP2009/002889, filed on Jun. 24, 2009, which in turn claims the benefit of Japanese Application Nos. 2008-165562, filed on Jun. 25, 2008, 2008-165563, filed on Jun. 25, 2008, 2008-192979, filed on Jul. 28, 2008 and 2008-307173, filed on Dec. 2, 2008, the disclosures of which Applications are incorporated by reference herein.

TECHNICAL FIELD

The invention relates to an electrode structure for use in a non-aqueous electrolyte secondary battery such as a lithium ion secondary battery, and a non-aqueous electrolyte secondary battery, and particularly to an improvement in the joint between an electrode and an electrode lead.

BACKGROUND ART

With the recent trend of portable electronic devices toward miniaturization and high performance, there is an increasing demand for secondary batteries used as the power source for such electronic devices. In particular, non-aqueous electrolyte secondary batteries such as lithium ion secondary batteries, which have high energy density and can be easily made more light-weight, are being actively developed. As electronic devices are increasingly becoming higher in performance and functionality and more compact, non-aqueous electrolyte secondary batteries are required to provide higher capacity.

In non-aqueous electrolyte secondary batteries, electrodes (positive and negative electrodes) are usually produced, for example, by applying a paint containing an active material, a binder, a conductive agent, etc. onto a surface of a current collector made of a long strip-like metal foil to form an active material layer. The current collector is connected to an external terminal, such as a battery case or seal plate, with an electrode lead made of a rectangular metal strip.

The current collector is connected to the electrode lead at the part where the current collector is exposed at the surface of the electrode, i.e., the exposed part of the current collector, since if the connection is made through the active material layer, sufficient electrical continuity cannot be obtained. The exposed part of the current collector is formed by removing the active material layer on a part of the current collector over the whole width, or not applying the paint onto a part of the current collector over the whole width (see PTLs 1 and 2).

Also, it has been proposed to connect a current collector and an electrode lead, for example, by placing the electrode lead on the exposed part of the current collector, applying a fluing process to the overlapping part from the electrode lead side so as to penetrate through the electrode lead and the current collector and cause a part of the electrode lead to penetrate through the current collector, and crimping the part of the electrode lead (see PTLs 3 and 4).

CITATION LIST

Patent Literature

[PTL 1] Japanese Laid-Open Patent Publication No. Hei 5-13064
[PTL 2] Japanese Laid-Open Patent Publication No. Hei 1-265452
[PTL 3] Japanese Laid-Open Patent Publication No. Hei 5-62666
[PTL 4] Japanese Laid-Open Patent Publication No. 2000-90994

SUMMARY OF INVENTION

Technical Problem

However, in the case of forming an exposed part of a current collector for connecting an electrode lead as in the above-described conventional techniques, it is necessary to form an exposed part that is wider than the electrode lead to leave some margin. It is thus necessary to form an exposed part having no active material layer at a relatively large surface area of the current collector, which becomes an obstacle to the achievement of high capacity.

Further, to meet the demand for higher capacity, methods of forming an active material layer by depositing an active material including silicon (Si), germanium (Ge), or tin (Sn) on a current collector have recently been receiving attention, in place of conventional methods of forming an active material layer by application. Such methods are being examined for practical utilization. When an active material is deposited on a current collector, the binder contained in the active material layer can be reduced or eliminated. Also, the pores of the active material layer can be reduced or eliminated. In addition, since the active material layer is integrally formed on the current collector, the conductivity between the active material layer and the current collector also becomes very good, so the conductive agent contained in the active material layer can also be reduced or eliminated. It is therefore possible to reduce the electrode thickness and enable high capacity. Hence, such methods are expected as techniques capable of achieving high performance in terms of both capacity and cycle life.

However, when deposition is used to form an active material layer on a current collector, it is difficult to form an exposed part on the current collector. According to application methods, an exposed part of a current collector can be formed, for example, by intermittently applying a paint containing an active material with a dye coater while transporting a long strip-like current collector in the longitudinal direction. It is also relatively easy to partially remove the formed active material layer to form an exposed part of the current collector.

Contrary to this, when deposition is used to form an active material layer, such operations of not forming an active material layer at some area or partially removing the formed active material layer are very troublesome, thus being substantially impossible.

Hence, as illustrated in FIG. 29, one possible approach is to form a crimped part 105 of an electrode lead 104 on an active material layer 102, not on the exposed part of a current collector 101, as shown in PTLs 3 and 4.

However, in this case, the active material layer 102 is sandwiched between the crimped part 105 and the current collector 101. This makes the electrical continuity between the current collector 101 and the electrode lead 104 unstable or makes the electrical resistance between the electrode lead and the current collector high, thereby posing problems. In particular, when an insulating layer is formed on the active material layer to enhance battery safety and reliability, the electrical resistance between the electrode lead and the current collector becomes high.

In view of the problems as described above, an object of the invention is to provide an electrode structure for a non-aqueous electrolyte secondary battery in which a current collector and an electrode lead can be joined so as to provide stable electrical continuity therebetween and high capacity without decreasing the amount of active material carried on the current collector, as well as a method of producing such an electrode structure and a non-aqueous electrolyte secondary battery.

Solution to Problem

In order to achieve the above object, the invention provides an electrode structure for a non-aqueous electrolyte secondary battery. The electrode structure includes:

an electrode including a current collector with two main surfaces and an active material layer formed on each of the main surfaces of the current collector, the current collector comprising a long strip-like metal foil and being exposed at at least one of an end of the electrode, a through-hole penetrating through the electrode, and a recess formed by removing the active material layer from one of the main surfaces of the electrode;

an electrode lead; and a joint for joining the electrode and the electrode lead so as to provide electrical continuity between the exposed current collector and the electrode lead.

In a preferable embodiment of the electrode structure for a non-aqueous electrolyte secondary battery according to the invention, the joint is formed at one end of the electrode in the width direction of the electrode.

In another preferable embodiment of the electrode structure for a non-aqueous electrolyte secondary battery according to the invention, the electrode lead has a part overlapping the electrode and one end face which is disposed so as to be flush with an end face of the electrode at the one end in the width direction, and the joint is formed so as to extend over the end face of the electrode at the one end in the width direction and the one end face of the electrode lead.

In still another preferable embodiment of the electrode structure for a non-aqueous electrolyte secondary battery according to the invention, an additional joint is formed at the other end of the electrode in the width direction.

In still another preferable embodiment of the electrode structure for a non-aqueous electrolyte secondary battery according to the invention, the electrode lead has a step that is formed so as to be flush with an end face of the electrode at the other end in the width direction, and the joint formed at the other end joins the current collector exposed at the other end of the electrode in the width direction and the step of the electrode lead.

In still another preferable embodiment of the electrode structure for a non-aqueous electrolyte secondary battery according to the invention, the electrode lead is affixed to the other end of the electrode in the width direction with adhesive tape.

In still another preferable embodiment of the electrode structure for a non-aqueous electrolyte secondary battery according to the invention, the joint comprises a first contact part in contact with one end face of the electrode lead, a second contact part in contact with an end face of the electrode at the one end, and a bent part between the first contact part and the second contact part, and the one end face of the electrode lead faces the end face of the electrode at the one end.

In still another preferable embodiment of the electrode structure for a non-aqueous electrolyte secondary battery according to the invention, the joint is formed at one end of the electrode in the longitudinal direction of the electrode.

In still another preferable embodiment of the electrode structure for a non-aqueous electrolyte secondary battery according to the invention, the electrode lead has a part overlapping the electrode and one end face which is disposed so as to be flush with an end face of the electrode at the one end in the longitudinal direction, and the joint is formed so as to extend over the end face of the electrode at the one end in the longitudinal direction and the one end face of the electrode lead.

In still another preferable embodiment of the electrode structure for a non-aqueous electrolyte secondary battery according to the invention, the other end of the electrode lead is affixed to the electrode with adhesive tape.

In still another preferable embodiment of the electrode structure for a non-aqueous electrolyte secondary battery according to the invention, the electrode lead has a part which is cut and raised, and the joint comprises the cut-raised part inserted and resolidified in the through-hole.

In still another preferable embodiment of the electrode structure for a non-aqueous electrolyte secondary battery according to the invention, the cut-raised part of the electrode lead has a sharp tip.

In still another preferable embodiment of the electrode structure for a non-aqueous electrolyte secondary battery according to the invention, the cut-raised part of the electrode lead has a quadrangular shape.

In still another preferable embodiment of the electrode structure for a non-aqueous electrolyte secondary battery according to the invention, the cut-raised part of the electrode lead has a rounded tip.

In still another preferable embodiment of the electrode structure for a non-aqueous electrolyte secondary battery according to the invention, the electrode has the through-hole or recess shaped like a slit at a position overlapping or adjacent to an end of the electrode lead, and the joint comprises the end of the electrode lead resolidified so as to join the current collector exposed in the slit-like through-hole or recess and the electrode lead.

In still another preferable embodiment of the electrode structure for a non-aqueous electrolyte secondary battery according to the invention, the slit-like through-hole or recess is parallel to the longitudinal direction of the electrode.

In still another preferable embodiment of the electrode structure for a non-aqueous electrolyte secondary battery according to the invention, the slit-like through-hole or recess is perpendicular to the longitudinal direction of the electrode.

In still another preferable embodiment of the electrode structure for a non-aqueous electrolyte secondary battery according to the invention, the slit-like through-hole or recess is slanted relative to the longitudinal direction of the electrode.

In still another preferable embodiment of the electrode structure for a non-aqueous electrolyte secondary battery according to the invention, the electrode lead has a crimped part penetrating through the thickness of the electrode.

In still another preferable embodiment of the electrode structure for a non-aqueous electrolyte secondary battery according to the invention, the electrode lead and the electrode overlap each other and are bonded together at the overlapping part with adhesive.

Also, the invention provides a method for producing an electrode structure for a non-aqueous electrolyte secondary battery. This method includes the steps of:

(a) providing an electrode having an active material layer on each of two main surfaces of a current collector comprising a long strip-like metal foil, the current collector being exposed at at least one of an end of the electrode, a through-hole penetrating through the electrode, and a recess formed by removing the active material layer from one of the main surfaces of the electrode; and (b) forming a joint that joins the exposed current collector and an electrode lead so as to provide electrical continuity therebetween.

In a preferable embodiment of the method for producing an electrode structure for a non-aqueous electrolyte secondary battery according to the invention, the step b includes the steps of:

overlapping the electrode lead and the electrode so that one end face of the electrode lead is flush with one end face of the electrode in the width direction of the electrode; and forming the joint so as to extend over the one end face of the electrode lead and the one end face of the electrode in the width direction.

In still another preferable embodiment of the method for producing an electrode structure for a non-aqueous electrolyte secondary battery according to the invention, the step b further includes the step of turning around the joint so that the one end face of the electrode lead faces the one end face of the electrode in the width direction.

In still another preferable embodiment of the method for producing an electrode structure for a non-aqueous electrolyte secondary battery according to the invention, the step b includes the steps of cutting and raising a part of the electrode lead, inserting the cut-raised part of the electrode lead in the through-hole, melting the cut-raised part, and resolidifying the molten cut-raised part to form the joint.

In still another preferable embodiment of the method for producing an electrode structure for a non-aqueous electrolyte secondary battery according to the invention, the step b includes the steps of:

forming the through-hole or recess shaped like a slit at a position overlapping or adjacent to an end of the electrode lead; and melting the end of the electrode lead so as to cause a molten portion to flow into the slit-like through-hole or recess and resolidifying the molten portion to form the joint.

Also, the invention provides a non-aqueous electrolyte secondary battery including:

an electrode assembly including a positive electrode and a negative electrode which are wound or layered with a separator interposed therebetween, each of the positive and negative electrodes being shaped like a long strip;

an electrode lead joined to the positive electrode and an electrode lead joined to the negative electrode;

a non-aqueous electrolyte;

a battery case housing the electrode assembly and the non-aqueous electrolyte; and a seal member sealing an opening of the battery case.

At least one of an electrode structure including the electrode lead joined to the positive electrode and an electrode structure including the electrode lead joined to the negative electrode is the above-mentioned electrode structure for a non-aqueous electrolyte secondary battery.

Advantageous Effects of Invention

In the electrode structure for a non-aqueous electrolyte secondary battery according to the invention, an electrode and an electrode lead can be joined with a small resistance between the electrode and the electrode lead without providing the electrode with a large area where the active material layer is not formed. Hence, the amount of active material contained in the battery can be easily increased relative to conventional amounts, and high capacity can be achieved. Therefore, the capacity of the non-aqueous electrolyte secondary battery can be easily heightened.

BRIEF DESCRIPTION OF DRAWINGS

FIG. 29 is an enlarged cross-sectional view of a conventional non-aqueous electrolyte secondary battery.

DESCRIPTION OF EMBODIMENTS

Embodiments of the invention are hereinafter described with reference to drawings.

Embodiment 1

Figure 1A:
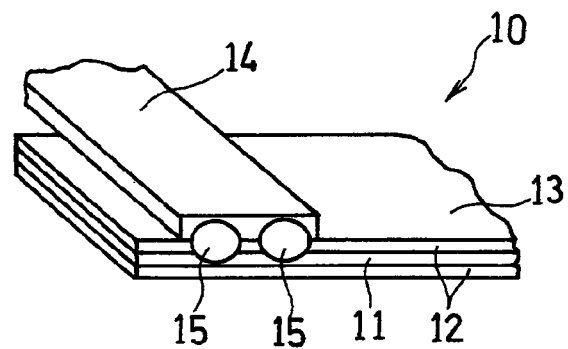
FIG. 1A is a perspective view schematically showing the structure of an electrode structure for a non-aqueous electrolyte secondary battery according to Embodiment 1 of the invention.
Figure 1B:
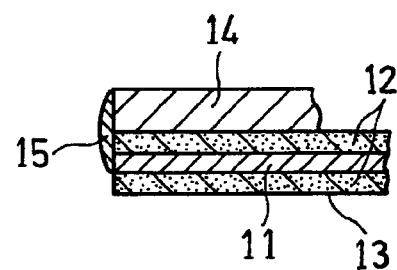
FIG. 1B is a cross-sectional view of the electrode structure for a non-aqueous electrolyte secondary battery.

FIGS. 1A and 1B are a perspective view and a cross-sectional view schematically showing the structure of an electrode structure for a non-aqueous electrolyte secondary battery according to Embodiment 1 of the invention, respectively.

An electrode structure 10 of the illustrated example is designed for use in a non-aqueous electrolyte secondary battery such as a lithium ion secondary battery. It includes: an electrode 13 composed of active material layers 12 formed on two whole main surfaces of a current collector 11 made of a long strip-like metal foil; and an electrode lead 14 for connecting the electrode 13 to an external terminal (a battery case, a seal plate, or the like) of a non-aqueous electrolyte secondary battery.

Also, the electrode structure 10 further includes a predetermined number (two in the illustrated example) of joints 15 for joining the electrode 13 and the electrode lead 14 while providing electrical continuity between the current collector 11 and the electrode lead 14.

The electrode lead 14, which is shaped like a flat rectangular strip, is disposed on the active material layer 12 so as to partially overlap the electrode 13. Also, the electrode lead 14 is disposed so that one end face thereof is flush with one end face of the electrode 13 in the width direction of the electrode 13.

The joints 15 are formed so as to provide electrical continuity between the electrode lead 14 and the current collector 11 exposed at the one end face of the electrode 13 in the width direction. The joints 15 are formed, for example, by plasma welding using a filler metal. It is preferable to form a plurality of the joints 15. Further, it is preferable to form them linearly, not in the form of dots. In this case, it is possible to increase bonding strength and decrease electrical resistance.

As described above, in the electrode structure 10 of FIG. 1A, the joints 15 join the electrode 13 and the electrode lead 14 so as to provide electrical continuity between the electrode lead 14 and the current collector 11 exposed at the one end face of the electrode 13 in the width direction. This eliminates the need to provide the main surfaces of the electrode 13 with any exposed part of the current collector 11 for connecting the electrode lead 14 to the current collector 11, thereby making it possible to provide the active material on two whole main surfaces of the current collector 11. As a result, the amount of active material carried on the current collector 11 can be increased compared with conventional amounts. Also, since the area of the active material layers 12 can be increased, the reaction area of the positive electrode and the negative electrode is also increased. Therefore, the use of the electrode structure 10 in a non-aqueous electrolyte secondary battery can provide a high capacity non-aqueous electrolyte secondary battery.

Also, the joints 15 are formed so as to contact only one end face of the electrode 13 in the width direction and one end face of the electrode lead. This provides electrical continuity between the current collector 11 and the electrode lead 14 without damaging the active material layers 12 formed on the main surfaces of the electrode 13. It is thus possible to suppress capacity decrease and eliminate a cause of separation of the active material from the active material layers 12. Therefore, the use of the electrode structure 10 in a non-aqueous electrolyte secondary battery can provide a non-aqueous electrolyte secondary battery with higher capacity and higher safety.

Also, since the joints 15 are formed at one end of the electrode 13 in the width direction, the position in the longitudinal direction of the electrode 13 to which the electrode lead 14 is attached can be freely selected. Therefore, the use of the electrode structure 10 in a non-aqueous electrolyte secondary battery can provide a non-aqueous electrolyte secondary battery with large design flexibility.

Figure 2:
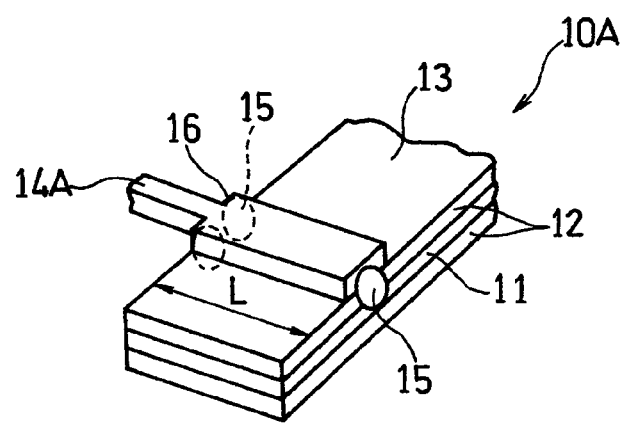
FIG. 2 is a perspective view showing a modified example of the electrode structure for a non-aqueous electrolyte secondary battery.

FIG. 2 shows a modified example of the electrode structure for a non-aqueous electrolyte secondary battery illustrated in FIG. 1A. In an electrode structure 10A of this modified example, joints 15 are formed not only at one end of an electrode 13 in the width direction of the electrode 13 but also at the other end. An electrode lead 14A of the illustrated example has steps 16 on both sides at a position away from one end face thereof for a length L. The length L is equal to the width of the electrode 13. The joints 15 are formed so as to extend over each of the steps 16 on both sides of the electrode lead 14 and the end face of the electrode 13 at the other end in the width direction.

As in this modified example, when the joints 15 are formed at both ends, i.e., one end and the other end, of the electrode 13 in the width direction, the bonding strength between the electrode 13 and the electrode lead 14A can be increased.

Figure 3:
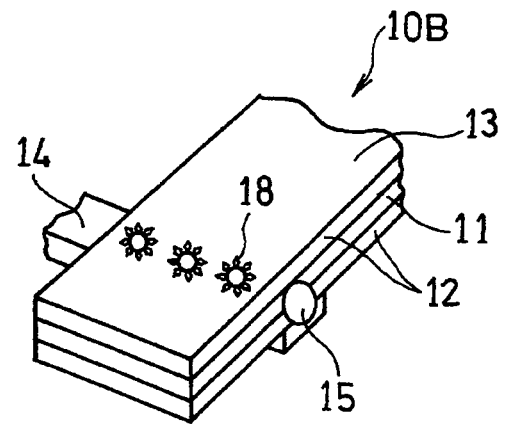
FIG. 3 is a perspective view showing another modified example of the electrode structure for a non-aqueous electrolyte secondary battery.

FIG. 3 shows another modified example of the electrode structure. In an electrode structure 10B of this modified example, the overlapping part of an electrode 13 and an electrode lead 14 has a predetermined number (three in the illustrated example) of crimped parts 18 for fixing the electrode lead 14 to the electrode 13. The crimped parts 18 are formed by causing parts of the electrode lead 14 to protrude so as to penetrate through the electrode 13 by a fluing process or the like, and bending the parts protruding from the electrode 13.

In this way, when the crimped parts 18 of the electrode lead 14 are provided at the overlapping part of the electrode 13 and the electrode lead 14 in addition to a joint 15 formed so as to join the electrode lead 14 to the electrode 13, the bonding strength between the electrode 13 and the electrode lead 14 can be increased.

Figure 4:
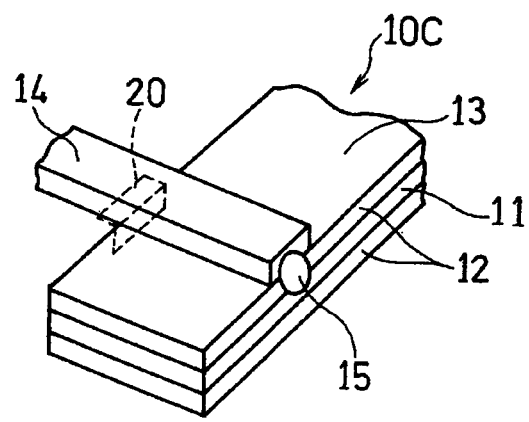
FIG. 4 is a perspective view showing still another modified example of the electrode structure for a non-aqueous electrolyte secondary battery.

FIG. 4 shows still another modified example of the electrode structure. In an electrode structure 10C of this modified example, an electrode lead 14 is affixed to an electrode 13 with adhesive tape 20 at the other end of the electrode 13 in the width direction. As illustrated in FIG. 4, it is preferable to affix the adhesive tape 20 so as to extend over the face of the electrode lead 14 in contact with the electrode 13 and the end face of the electrode 13 at the other end in the width direction.

In this way, when the electrode lead 14 is affixed to the electrode 13 with the adhesive tape 20 at the other end of the electrode 13 in the width direction in addition to a joint 15 formed so as to join the electrode lead 14 to the electrode 13, the bonding strength between the electrode 13 and the electrode lead 14 can be increased. Also, when the crimped parts 18 are provided, the surface of the electrode lead 14 becomes irregular. Contrary to this, when the adhesive tape 20 is used to fix the electrode lead 14 to the electrode 13 in a manner shown in FIG. 4, the bonding strength between the electrode 13 and the electrode lead 14 can be increased without causing the surface of the electrode lead 14 to become irregular. Therefore, when the electrode 13 is, for example, wound to form an electrode assembly, it is possible to prevent such problems as damaging the surface of the electrode 13.

Also, in the case of the crimped parts 18, the active material layers 12 of the electrode 13 are inevitably damaged. Contrary to this, in the case of the adhesive tape 20, the bonding strength between the electrode 13 and the electrode lead 14 can be increased without damaging the active material layers 12. It is thus possible to increase capacity.

Figure 5:
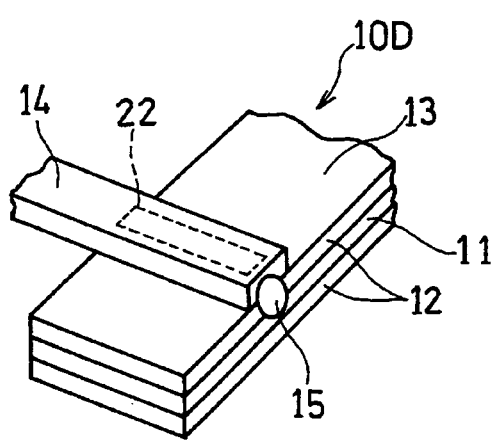
FIG. 5 is a perspective view showing still another modified example of the electrode structure for a non-aqueous electrolyte secondary battery.

FIG. 5 shows still another modified example of the electrode structure. In an electrode structure 10D of this modified example, the part of an electrode lead 14 overlapping an electrode 13 is bonded to the electrode 13 with adhesive 22.

Thus, the bonding strength between the electrode 13 and the electrode lead 14 can be increased. Also, compared with the use of the adhesive tape 20 for fixing (see FIG. 4), it is possible to increase the bonding strength between the electrode 13 and the electrode lead 14 while reducing the surface irregularity of the electrode lead 14. In addition, the active material layers 12 are not damaged.

Figure 6:
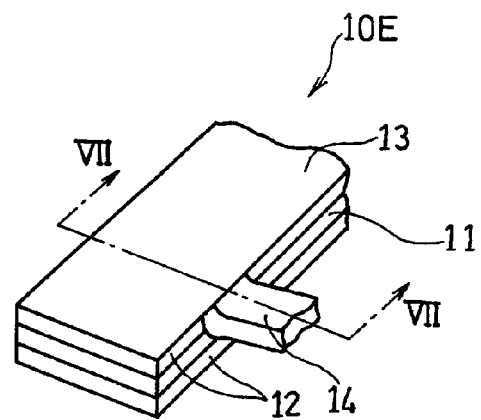
FIG. 6 is a perspective view showing still another modified example of the electrode structure for a non-aqueous electrolyte secondary battery.

FIG. 6 shows still another modified example of the electrode structure. An electrode structure 10E of this modified example is formed by turning around the electrode lead 14 of the electrode structure 10 illustrated in FIG. 1A so that one end face of the electrode lead 14 faces one end face of the electrode 13 in the width direction.

Figure 7:
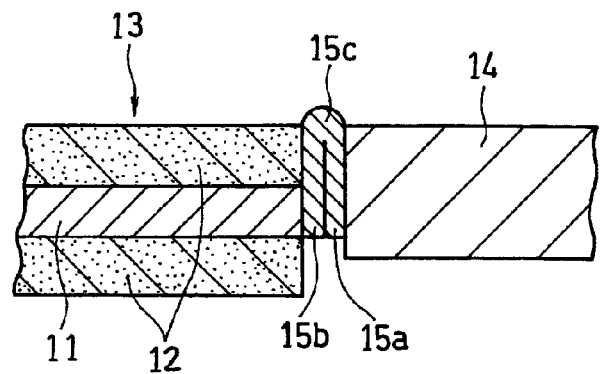
FIG. 7 is a cross-sectional view of the modified example.

FIG. 7 is an enlarged sectional view taken along VII-VII line of FIG. 6. As shown in FIG. 7, in the electrode structure 10E, by turning around the electrode lead 14, a joint 15 is provided with a first contact part 15a in contact with the one end face of the electrode lead 14, a second contact part 15b in contact with the one end face of the electrode 13 in the width direction, and a bent part 15c therebetween.

As described above, by turning around the electrode lead 14, it is possible to prevent the thickness of the electrode structure from increasing at the overlapping part of the electrode 13 and the electrode lead 14. It is thus possible to prevent distortion of the electrode structure and further increase capacity.

Next, the current collector 11 and the active material layers 12 are described.

While the positive electrode is not particularly limited, the positive electrode current collector can be made of an aluminum or aluminum alloy foil. The thickness can be 5 μm to 50 μm. The positive electrode active material layers can be formed by applying a positive electrode mixture paint onto surfaces of a positive electrode current collector, drying it, and rolling it. The positive electrode mixture paint can be prepared by mixing and dispersing a positive electrode active material, a conductive agent, and a binder in a dispersion medium with a disperser such as a planetary mixer.

Examples of positive electrode active materials include composite oxides such as lithium cobaltate and modified lithium cobaltate (solid solution of lithium cobaltate with aluminum or magnesium dissolved therein), lithium nickelate and modified lithium nickelate (in which nickel is partially replaced with cobalt, etc.), and lithium manganate and modified lithium manganate.

Examples of positive electrode conductive agents include carbon blacks such as acetylene black, ketjen black, channel black, furnace black, lamp black, and thermal black, and various graphites, and they may be used singly or in combination.

Examples of positive electrode binders include polyvinylidene fluoride (PVdF), modified polyvinylidene fluoride, polytetrafluoroethylene (PTFE), and a particulate rubber binder having an acrylate unit. Also, the binder can contain an acrylate monomer with a reactive functional group introduced therein, or an acrylate oligomer.

Also, while the negative electrode is not particularly limited, the negative electrode current collector can be made of a rolled copper foil, an electrolytic copper foil, etc. The thickness of the negative electrode current collector can be 5 μm to 50 μm. The negative electrode active material layers are formed by applying a negative electrode mixture paint onto surfaces of a negative electrode current collector, drying it, and rolling it. The negative electrode mixture paint is prepared by mixing and dispersing a negative electrode active material, a binder, and if necessary, a conductive agent and a thickener in a dispersion medium with a disperser such as a planetary mixer.

Preferable examples of negative electrode active materials include carbon materials such as graphite, and alloy type materials. Examples of alloy type materials include silicon oxides, silicon, silicon alloys, tin oxides, tin, and tin alloys. Among them, silicon oxides are preferable. It is desirable that silicon oxides be represented by the general formula $SiO_x$ wherein $0<x<2$, preferably $0.01 \leq x \leq 1$. Desirable metal elements other than silicon in silicon alloys are metal elements which, together with lithium, do not form an alloy, for example, titanium, copper, and nickel.

With respect to the negative electrode binder, various binders such as PVdF and modified PVdF can be used. However, in terms of improving lithium ion acceptance, it is preferable to use styrene-butadiene copolymer rubber particles (SBR) and modified SBR as negative electrode binders.

The negative electrode thickener is not particularly limited if it is a material an aqueous solution of which is viscous, such as polyethylene oxide (PEO) or polyvinyl alcohol (PVA). However, cellulose resins such as carboxymethyl cellulose (CMC) and modified cellulose resins are preferable in terms of the dispersion and viscosity of the electrode mixture paint.

In addition to the above-described application method, the active material layer 12 can also be formed by forming a thin film of an active material on a surface of the current collector 11. Such thin films can be formed by dry processes such as deposition, sputtering, and CVD, which are vacuum processes.

The thickness of the active material thin film formed by these methods is preferably in the range of about 5 to 30 μm, and more preferably in the range of 10 to 25 μm, although it differs depending on the required characteristics of the non-aqueous secondary battery to be produced.

Examples of Embodiment 1 are hereinafter described. The invention is not to be construed as being limited to these Examples.

Example 1

An electrode structure with the same structure as that illustrated in FIG. 1A was produced as follows.

A 26-μm thick copper foil was used as a current collector 11. A 20-μm thick active material layer 12 comprising an oxide of Si (silicon) was formed on each side of the current collector 11 by vacuum deposition. The current collector 11 with the active material layers 12 formed on both sides was cut to a long strip with a length of 900 mm and a width of 60 mm, to form a 66-μm thick electrode (negative electrode) 13. An electrode lead 14 with a width of 4 mm and a thickness of 0.1 mm was disposed such that it partially overlapped the electrode 13 and that one end face thereof was flush with one end face of the electrode 13 in the width direction of the electrode 13. This was secured with a jig. The material of the electrode lead 14 was copper.

Thereafter, by plasma welding, joints 15 were formed so as to extend over the one end face of the electrode 13 in the width direction and the one end face of the electrode lead 14, thereby providing electrical continuity between the electrode lead 14 and the current collector 11 exposed at the one end face of the electrode 13 in the width direction.

Example 2

An electrode structure with the same structure as that illustrated in FIG. 2 was produced as follows.

In the same manner as in Example 1, a negative electrode 13 was produced. An electrode lead 14A having steps 16 was produced. The steps 16 were formed on both sides of the electrode lead 14A at a position away from one end face thereof for a length of 60 mm, and the width of the part of each step 16 parallel to the one end face was 1 mm. The material of the electrode lead 14A was the same as that of the electrode lead 14 of Example 1.

A joint 15 was formed at one end of the electrode 13 in the width direction in the same manner as in Example 1, and joints 15 were then formed so as to extend over each of the steps 16 and the end face of the electrode 13 at the other end in the width direction by plasma welding.

Example 3

An electrode structure with the same structure as that illustrated in FIG. 3 was produced as follows.

In the same manner as in Example 1, a negative electrode 13 was produced, and a joint 15 was formed at one end of the electrode 13 in the width direction. Thereafter, by a fluing process, parts of an electrode lead 14 were caused to protrude so as to penetrate through the electrode 13. Thereafter, the parts of the electrode lead 14 protruding from the electrode 13 were bent and crimped to form three crimped parts 18.

Example 4

An electrode structure with the same structure as that illustrated in FIG. 4 was produced as follows.

In the same manner as in Example 1, a negative electrode 13 was produced, and a joint 15 was formed at one end of the electrode 13 in the width direction. Thereafter, adhesive tape 20 was affixed so as to extend over the face of an electrode lead 14 in contact with the electrode 13 and the end face of the electrode 13 at the other end in the width direction.

Example 5

An electrode structure with the same structure as that illustrated in FIG. 5 was produced as follows.

In the same manner as in Example 1, a negative electrode 13 was produced, and a joint 15 was formed at one end of the electrode 13 in the width direction. Thereafter, the part of an electrode lead 14 overlapping the electrode 13 was bonded to the electrode 13 by adhesive 22.

Example 6

An electrode structure with the same structure as that illustrated in FIG. 6 was produced as follows.

In the same manner as in Example 1, a negative electrode 13 was produced, and joints 15 were formed at one end of the electrode 13 in the width direction. Thereafter, the electrode lead 14 was turned around so that one end face of the electrode lead 14 faced the end face of the electrode 13 at the one end in the width direction.

Example 7

A positive electrode structure with the same structure as that illustrated in FIG. 1A was produced in the following manner.

A 20-μm thick aluminum foil was used as a current collector 11. A positive electrode mixture paint was prepared by mixing lithium cobaltate serving as an active material, acetylene black serving as a conductive agent, and polyvinylidene fluoride (PVdF) as a binder. The positive electrode mixture paint was applied onto both sides of the current collector 11 and dried, and this was compressed with a press until the total thickness became 100 μm. Thereafter, it was cut to a long strip with a length of 800 mm and a width of 55 mm, to produce a positive electrode 13. An electrode lead 14 with a width of 4 mm and a thickness of 0.1 mm was disposed such that it partially overlapped the electrode 13 and that one end face thereof was flush with one end face of the electrode 13 in the width direction. This was secured with a jig. The material of the electrode lead 14 was aluminum.

Thereafter, by plasma welding, joints 15 were formed so as to extend over the one end face of the electrode 13 in the width direction and the one end face of the electrode lead 14, thereby providing electrical continuity between the electrode lead 14 and the current collector 11 exposed at the one end face of the electrode 13 in the width direction.

Comparative Example 1

In the same manner as in Example 1, a negative electrode 13 was produced. Adhesive was applied to an area where a part of an electrode lead 14 with a width of 4 mm and a thickness of 0.1 mm and the electrode 13 were to overlap each other, and the electrode 13 and the electrode lead 14 were bonded together. Thereafter, the overlapping area was sandwiched between 2-mm diameter electrode rods from above and below and spot welded in an attempt to join the electrode 13 and the electrode lead 14.

Comparative Example 2

In the same manner as in Example 1, a negative electrode 13 was produced. Adhesive was applied to an area where a part of an electrode lead 14 with a width of 4 mm and a thickness of 0.1 mm and the electrode 13 were to overlap each other, and the electrode 13 and the electrode lead 14 were bonded together. Thereafter, the overlapping area was sandwiched between an anvil and a horn for ultrasonic welding from above and below and spot welded in an attempt to join the electrode 13 and the electrode lead 14.

Comparative Example 3

A conventional electrode structure with the same structure as that illustrated in FIG. 29 was produced in the following manner.

In the same manner as in Example 1, an electrode 103 was produced. An electrode lead 104 was placed on the electrode 103 so that one end face of the electrode 103 in the longitudinal direction of the electrode 103 was flush with one end face of the electrode lead 104 in the width direction of the electrode lead 104, and the electrode 103 and the electrode 104 were secured with a jig. Subsequently, by a fluing process, a part of the electrode lead 104 was caused to protrude so as to penetrate through the electrode 103. Thereafter, the part of the electrode lead 104 protruding from the electrode 103 was bent to form a crimped part 105.

Of each of Examples 1 to 6 and Comparative Examples 1 to 3, 100 electrode structures were produced. Using all the electrode structures, the electrical resistance between the electrode and the electrode lead was measured, and the average value for each of the Examples and Comparative Examples was calculated. Also, in order to examine the bonding strength between the electrode and the electrode lead, tensile strength was measured by pulling the electrode lead along the main surface of the electrode while securing the electrode, and the average value for each of the Examples and Comparative Examples was calculated. Also, the total thickness of the overlapping part of the electrode and the electrode lead was measured (note that since Example 6 has no overlapping part, the thickness of the electrode lead was measured), and the average value for each of the Examples and Comparative Examples was calculated. Table 1 shows the above results.

TABLE 1

|  | Electrical resistance (mΩ) | Tensile strength (N) | Total thickness (μm) |
| --- | --- | --- | --- |
| Example 1 | 0.7 | 35.7 | 188 |
| Example 2 | 0.6 | 62.3 | 186 |
| Example 3 | 0.7 | 75.2 | 289 |
| Example 4 | 0.6 | 38.5 | 244 |
| Example 5 | 0.8 | 37.7 | 216 |
| Example 6 | 0.8 | 42.5 | 100 |
| Example 7 | 0.7 | 35.6 | 221 |
| Comp. Example 1 | ∞ | 0.0 | 168 |
| Comp. Example 2 | ∞ | 0.4 | 172 |
| Comp. Example 3 | 57000 | 14.12 | 276 |

As is clear from Table 1, in Examples 1 to 7, since the joint(s) 15 provided electrical continuity between the current collector 11 and the electrode lead 14, the electrical resistance could be lowered.

Contrary to this, in Comparative Example 1, since welding current does not flow through the active material 12 on the surface of the electrode 13, the electrode 13 and the electrode lead 14 could not be welded together by spot welding, and electrical continuity between the electrical electrode 13 and the electrode lead 14 could not be obtained.

Likewise, in Comparative Example 2, the electrode 13 and the electrode lead 14 could not be welded together by ultrasonic welding, and electrical continuity between the electrical electrode 13 and the electrode lead 14 could not be obtained. This is because the active material layer 12 is composed of a Si oxide. This indicates that even ultrasonic waves could not destroy the active material layer 12.

Also, in Comparative Example 3, the electrical resistance is also significantly high. This is probably because, as illustrated in FIG. 29, the active material layer 102 intervenes between the current collector 101 and the crimped part 105 and the like, thereby significantly reducing the contact area of the current collector 101 and the electrode lead 104.

With respect to the tensile strength, all of the Examples 1 to 7 provided sufficient strength as the electrode structures for lithium ion secondary batteries. The tensile strength of lithium ion secondary batteries as measured by the above method usually needs to be 10 N or more. In particular, Example 2 with the joints 15 formed at both ends of the electrode 13 in the width direction and Example 3 with the crimped parts 18 could achieve higher tensile strength.

Contrary to this, Comparative Examples 1 and 2 failed to provide necessary strength since the electrode 13 and the electrode lead 14 were not welded together.

Also, Comparative Example 3 failed to provide sufficient strength since only the crimped parts 105 were used to secure the electrode lead to the electrode.

With respect to the total thickness, Example 3 with the crimped parts 18, Example 4 with the adhesive tape 20, and Example 5 with the adhesive 22 exhibited relatively large total thickness. Among them, Example 3 with the crimped parts 18 had the largest total thickness. However, none of the Examples 1 to 7 exhibited a thickness insufficient for practical use.

Also, Example 6 without the overlapping part of the electrode 13 and the electrode lead 14 had the smallest total thickness.

Embodiment 2

Figure 8A:
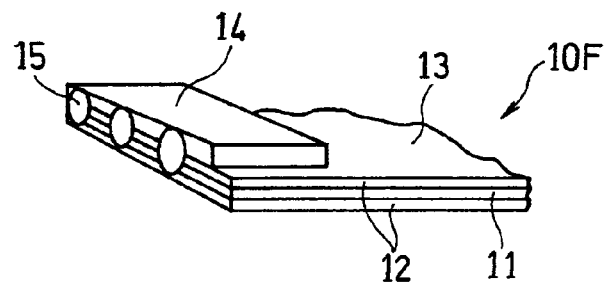
FIG. 8A is a perspective view schematically showing the structure of an electrode structure for a non-aqueous electrolyte secondary battery according to Embodiment 2 of the invention.
Figure 8B:
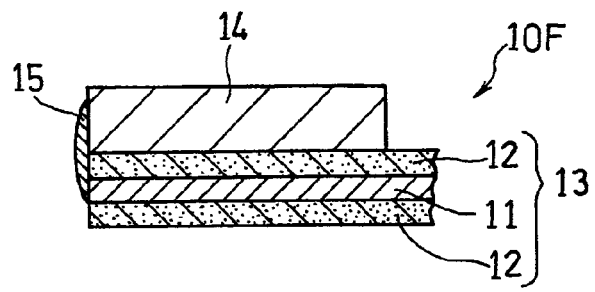
FIG. 8B is a cross-sectional view of the electrode structure for a non-aqueous electrolyte secondary battery.

Next, Embodiment 2 of the invention is described. FIGS. 8A and 8B are a perspective view and a cross-sectional view schematically showing the structure of an electrode structure for a non-aqueous electrolyte secondary battery according to Embodiment 2 of the invention. In FIGS. 8A and 8B, the same elements as those of Embodiment 1 are given the same reference characters, and the detailed descriptions thereof are omitted.

In an electrode structure 10F in the illustrated example, a predetermined number (three in the illustrated example) of joints 15 are formed at one end of an electrode 13 in the longitudinal direction of the electrode 13, not at an end of the electrode 13 in the width direction. The joints 15 are formed so as to extend over the end face of the electrode 13 at the one end in the longitudinal direction and one end face of an electrode lead 14 in the width direction.

In this way, when the joints 15 are formed at the end of the electrode 13 in the longitudinal direction, it is possible to achieve substantially the same effect as the effect of the electrode structure 10 of FIG. 1A. That is, this eliminates the need to provide the main surfaces of the electrode 13 with any exposed part of the current collector 11 for connecting the electrode lead 14 to the current collector 11, thereby making it possible to form active material layers 12 on two whole main surfaces of the current collector 11. As a result, the amount of active material carried on the current collector 11 can be maximized. Thus, the reaction area increases, and the use of this electrode structure 10 in a non-aqueous electrolyte secondary battery can provide a high capacity non-aqueous electrolyte secondary battery.

In addition, the width of the electrode 13 is usually significantly greater than that of the electrode lead 14. Hence, the total area of the joints 15 can be significantly increased, compared with the joints 15 formed at an end of the electrode 13 in the width direction. Thus, the bonding strength between the electrode 13 and the electrode lead 14 can be increased. Also, the electrical resistance between the electrode 13 and the electrode lead 14 can be decreased.

However, the position in the electrode 13 to which the electrode lead 14 is attached cannot be freely moved along the longitudinal direction of the electrode 13. In this respect, design flexibility decreases compared with the electrode structure of FIG. 1A.

Figure 9:
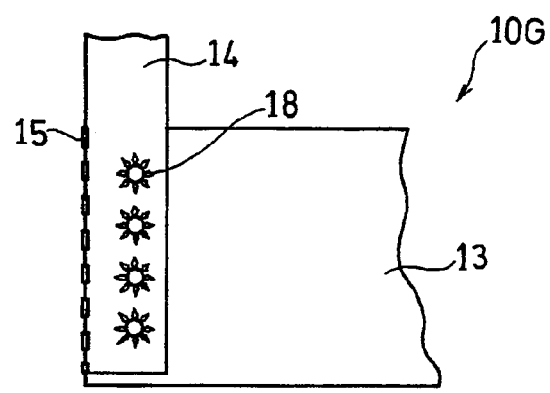
FIG. 9 is a plan view showing a modified example of the electrode structure for a non-aqueous electrolyte secondary battery.

FIG. 9 shows a modified example of the electrode structure for a non-aqueous electrolyte secondary battery illustrated in FIG. 8A. In an electrode structure 10G of this modified example, the overlapping part of an electrode 13 and an electrode lead 14 has a predetermined number (four in the illustrated example) of crimped parts 18 for fixing the electrode lead 14 to the electrode 13. The crimped parts 18 are formed by causing parts of the electrode lead 14 to protrude so as to penetrate through the electrode 13 by a fluing process or the like, and bending the parts protruding from the electrode 13.

In this way, when the crimped parts 18 are provided at the overlapping part of the electrode 13 and the electrode lead 14 in addition to joints 15 formed so as to join the electrode lead 14 to the electrode 13, the bonding strength between the electrode 13 and the electrode lead 14 can be increased.

Figure 10:
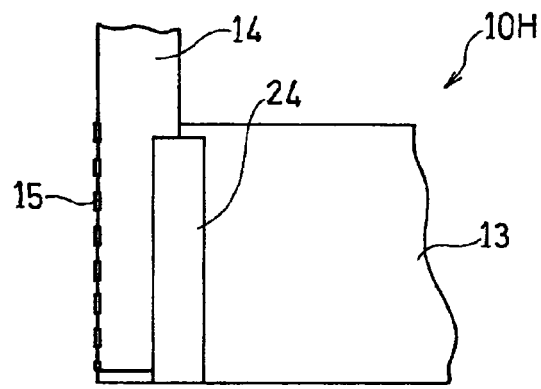
FIG. 10 is a plan view showing another modified example of the electrode structure for a non-aqueous electrolyte secondary battery.

FIG. 10 shows another modified example of the electrode structure. In an electrode structure 10H of this modified example, an end portion of an electrode lead 14 in the width direction opposite to the one end face on which the joints are formed is affixed to an electrode 13 with adhesive tape 24. Thus, the bonding strength between the electrode 13 and the electrode lead 14 can be increased.

Also, the surface irregularity of the electrode structure can be reduced, compared with the use of the crimped parts 18 to fix the electrode lead 14 to the electrode 13. Thus, when the electrode 13 is wound or layered to form an electrode assembly, it is possible to prevent the active material layers 12 on the surfaces of the electrode 13 from becoming damaged. As a result, problems such as separation of the active material can be prevented. It is therefore possible to provide an electrode for a non-aqueous electrolyte secondary battery having a large reaction area and a high capacity.

Figure 11:
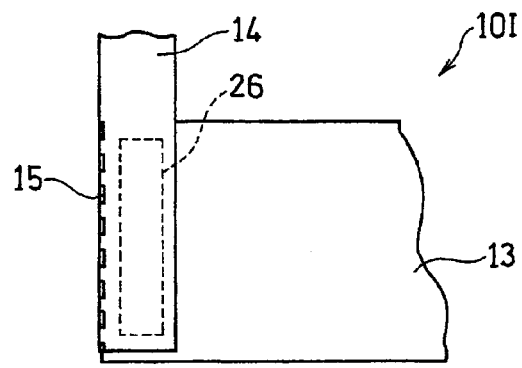
FIG. 11 is a plan view showing still another modified example of the electrode structure for a non-aqueous electrolyte secondary battery.

FIG. 11 shows still another modified example of the electrode structure. In an electrode structure 10I of this modified example, the part of an electrode lead 14 overlapping an electrode 13 is bonded to the electrode 13 by adhesive 26.

Thus, the bonding strength between the electrode 13 and the electrode lead 14 can be increased. Also, compared with the use of the adhesive tape 24 for fixing (see FIG. 10), it is possible to increase the bonding strength between the electrode 13 and the electrode lead 14 while reducing the surface irregularity of the electrode lead 14. In addition, the active material layers 12 are not damaged. As a result, problems such as separation of the active material can be prevented. It is therefore possible to provide an electrode for a non-aqueous electrolyte secondary battery having a large reaction area and a high capacity.

Examples of this embodiment 2 are hereinafter described. However, the invention is not to be construed as being limited to these Examples.

Example 8

An electrode structure with the same structure as that illustrated in FIG. 8A was produced as follows.

In the same manner as in Example 1, a negative electrode 13 was produced. An electrode lead 14 was placed on the electrode 13 so that one end face of the electrode 13 in the longitudinal direction of the electrode 13 was flush with one end face of the electrode lead 14 in the width direction of the electrode lead 14. The electrode 13 and the electrode 14 were then secured with a jig. Then, by plasma welding, joints 15 were formed so as to extend over the one end face of the electrode 13 in the longitudinal direction and the one end face of the electrode lead 14 in the width direction.

Example 9

An electrode structure with the same structure as that illustrated in FIG. 10 was produced as follows.

In the same manner as in Example 8, a negative electrode 13 was produced, and joints 15 were formed at one end of the electrode 13 in the longitudinal direction. Thereafter, using adhesive tape 24, an end portion of an electrode lead 14 in the width direction opposite to the one end face on which the joints were formed was affixed to the electrode 13.

Example 10

A positive electrode structure with the same structure as that illustrated in FIG. 8A was produced in the following manner.

In the same manner as in Example 7, a positive electrode 13 was produced. Using an aluminum electrode lead 14, joints 15 were formed at one end of the electrode 13 in the longitudinal direction in the same manner as in Example 8.

Of each of Examples 8 to 10, 100 electrode structures were produced. Using all the electrode structures, the electrical resistance between the electrode and the electrode lead was measured, and the average value for each of the Examples and Comparative Examples was calculated. Also, in order to examine the bonding strength between the electrode and the electrode lead, tensile strength was measured by pulling the electrode lead along the main surface of the electrode while securing the electrode, and the average value for each of the Examples and Comparative Examples was calculated. Table 2 shows the above results.

TABLE 2

|  | Electrical resistance (mΩ) | Tensile strength (N) |
| --- | --- | --- |
| Example 8 | 0.7 | 35.7 |
| Example 9 | 0.8 | 42.5 |
| Example 10 | 0.7 | 35.6 |

As is clear from Table 2, in Examples 8 to 10, since the joint(s) 15 provided electrical continuity between the current collector 11 and the electrode lead 14, the electrical resistance could be lowered.

With respect to the tensile strength, all of the Examples 1 to 8 provided sufficient strength as the electrode structures for lithium ion secondary batteries. The tensile strength of lithium ion secondary batteries as measured by the above method usually needs to be 10 N or more.

Embodiment 3

Next, Embodiment 3 of the invention is described.

Figure 12:
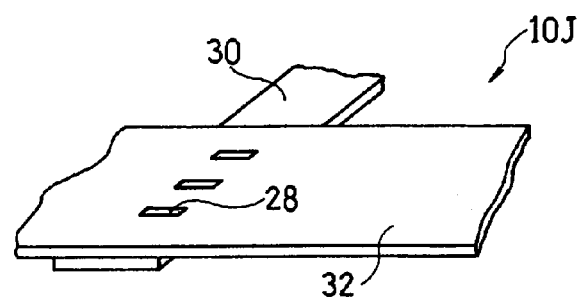
FIG. 12 is a perspective view schematically showing the structure of an electrode structure for a non-aqueous electrolyte secondary battery according to Embodiment 3 of the invention.

FIG. 12 schematically shows the structure of an electrode structure for a non-aqueous electrolyte secondary battery according to Embodiment 3 of the invention. In FIG. 12, the same elements as those of Embodiments 1 and 2 are given the same reference characters, and the detailed descriptions thereof are omitted.

In an electrode structure 10J in the illustrated example, an electrode lead 30 and an electrode 32 are joined by joints 28 at a middle area of the overlapping part of the electrode lead 30 and the electrode 32.

This joining method is described below.

Figure 13:
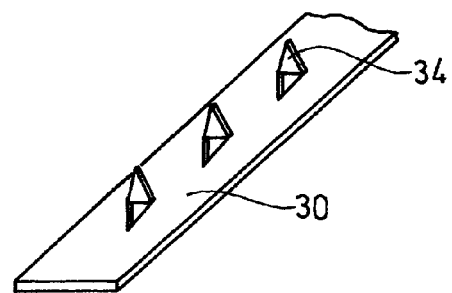
FIG. 13 is a perspective view schematically showing the structure of an electrode lead included in the electrode structure for a non-aqueous electrolyte secondary battery.

As illustrated in FIG. 13, the electrode lead 30, which is a constituent element of the electrode structure 10J, has a predetermined number (three in the illustrated example) of cut-raised parts 34 at predetermined intervals in the longitudinal direction. The cut-raised parts 34 have a pointed shape such as a triangle.

Figure 14:
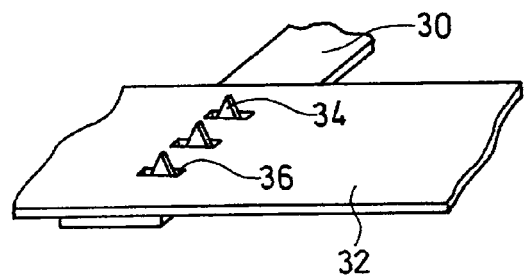
FIG. 14 is a perspective view showing the electrode structure for a non-aqueous electrolyte secondary battery in a production process.

As illustrated in FIG. 14, the electrode 32 has the same predetermined number (three in the illustrated example) of slit-like through-holes 36 at the same intervals in the width direction as those of the cut-raised parts 34. The through-holes 36 can be formed, for example, by a punch process after the active material layers 12 are formed on both faces of a current collector 11. They can also be formed using a cutter.

Figure 15:
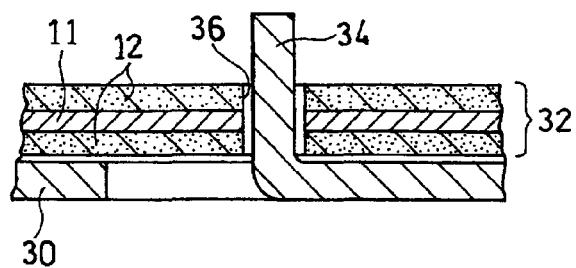
FIG. 15 is an enlarged cross-sectional view of the electrode structure for a non-aqueous electrolyte secondary battery in a production process.

As illustrated in FIG. 15, with the cut-raised part 34 inserted through the through-hole 36, the cut-raised part 34 is melted, for example, by TIG welding and resolidified to form a joint 28.

Figure 16:
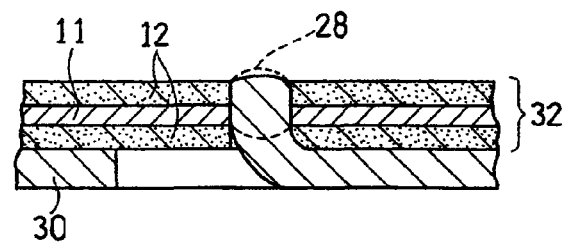
FIG. 16 is an enlarged cross-sectional view of the electrode structure for a non-aqueous electrolyte secondary battery in another production process.

As a result, as illustrated in FIG. 16, the joint 28 provides electrical continuity between the current collector 11 and the electrode lead 30, thereby joining the electrode lead 30 and the electrode 32. When a plurality of the joints 28 are formed, the electrical resistance can be reduced.

As described above, in the electrode structure 10J of FIG. 12, in the slit-like through-holes 36 formed in the electrode 32, the exposed current collector 11 and the electrode lead 30 are brought into electrical continuity by the joints 28 comprising the resolidified portions of the electrode lead 30, so as to join the electrode lead 30 and the electrode 32.

In this way, the electrode lead 30 and the electrode 32 can be connected without providing the surfaces of the electrode 32 with any large exposed part of the current collector 11.

Each of the cut-raised parts 34 has a pointed tip, so welding position can be easily determined. Also, since the volume of the cut-raised part 34 is relatively small, the whole joint 28 can be embedded in the through-hole 36. It is thus possible to prevent the surface of the electrode 32 from becoming irregular, in particular, having protrusions.

It is also possible to prevent the active material layers 12 from becoming damaged during welding.

Also, the through-holes 36 can be formed by a punch process or the like within a very short time, compared with removal of the active material layers 12 from a relatively large surface area of the electrode 32. Thus, productivity can be increased.

Figure 17:
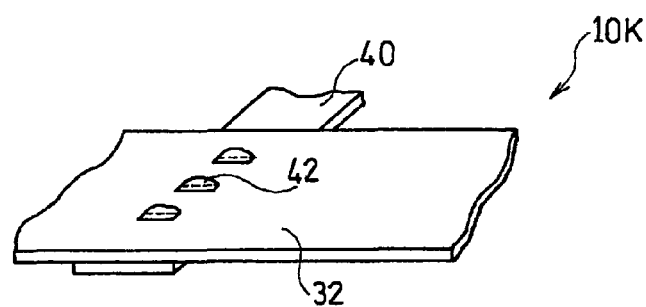
FIG. 17 is a perspective view showing a modified example of the electrode structure for a non-aqueous electrolyte secondary battery.
Figure 18:
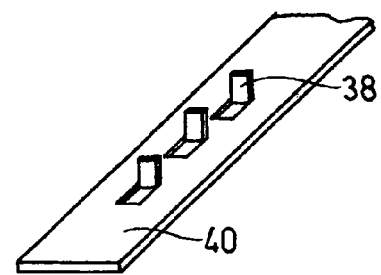
FIG. 18 is a perspective view schematically showing the structure of an electrode lead included in the modified example.
Figure 19:
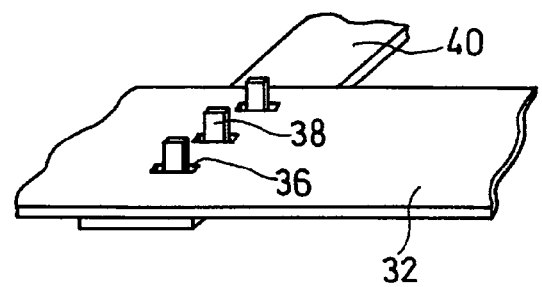
FIG. 19 is a perspective view showing the electrode structure for a non-aqueous electrolyte secondary battery in a production process.

FIGS. 17 to 19 show a modified example of the electrode structure for a non-aqueous electrolyte secondary battery illustrated in FIG. 12. As illustrated in FIG. 17, in an electrode structure 10K of this modified example, joints 42 also comprise resolidfied portions of an electrode lead 40. However, in this modified example, as illustrated in FIG. 18, cut-raised parts 38 of the electrode lead 40 are quadrangular, more specifically, substantially square or substantially rectangular.

In this way, when the cut-raised parts 38 are made quadrangular, the volume can be increased, compared with the cut-raised parts 34 of the electrode structure of FIG. 12. Hence, the volume of the joints 42 can be increased, and the contact area of the joints 42 and a current collector 11 can be enlarged. It is thus possible to decrease the electrical resistance between the electrode lead 40 and the electrode 32.

Figure 20:
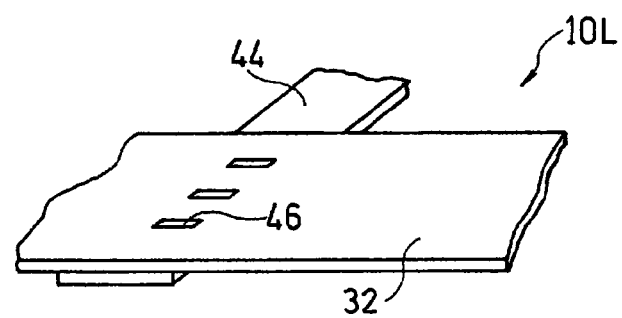
FIG. 20 is a perspective view showing another modified example of the electrode structure for a non-aqueous electrolyte secondary battery.
Figure 21:
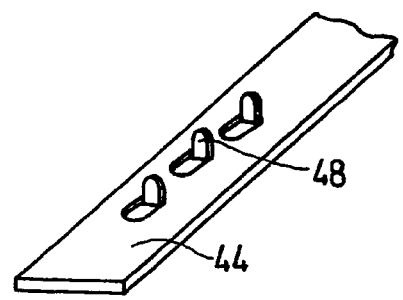
FIG. 21 is a perspective view schematically showing the structure of an electrode lead included in the modified example.
Figure 22:
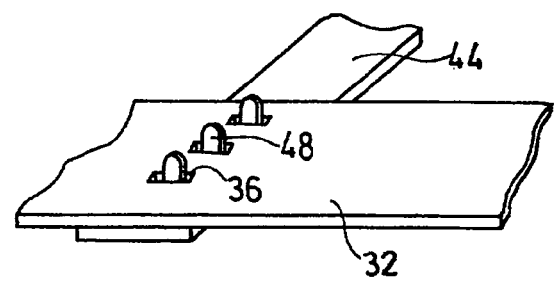
FIG. 22 is a perspective view showing the electrode structure for a non-aqueous electrolyte secondary battery in a production process.

FIGS. 20 to 22 show another modified example of the electrode structure. As illustrated in FIG. 20, in an electrode structure 10L of this modified example, joints 46 also comprise resolidified portions of an electrode lead 44. However, in this modified example, as illustrated in FIG. 21, the tip of each cut-raised part 48 of the electrode lead 44 is rounded.

In this way, in the case where the tip of each cut-raised part 48 is made rounded, when the cut-raised part 48 is melted by welding, it is possible to prevent formation of burrs by unmelted material. Also, compared with FIG. 12, the contact area of the current collector 11 and the joints 46 can be increased. Thus, electrical resistance can be reduced. It is also possible to prevent the surface of the electrode 13 from becoming irregular.

Examples of Embodiment 3 are hereinafter described. The invention is not to be construed as being limited to these Examples.

Example 11

An electrode structure with the same structure as that illustrated in FIG. 12 was produced as follows.

In the same manner as in Example 1, a negative electrode 32 was produced. Four slit-like through-holes 36 were formed in the part of the electrode 32 to overlap an electrode lead 30 by a punch process so that they aligned in the width direction of the electrode 30 at intervals of 10 mm. The length of the through-holes 36 was set to 2 mm, and the width thereof was set to 0.1 mm.

Also, the same number of cut-raised parts 34 with a shape illustrated in FIG. 13 were formed at the part of an electrode lead 40 to overlap the electrode 32 so that they aligned in the longitudinal direction of the electrode lead 40 at intervals of 10 mm.

Example 12

A positive electrode structure with the same structure as that illustrated in FIG. 12 was produced in the following manner.

In the same manner as in Example 7, a positive electrode 32 was produced. Using an aluminum electrode lead 14, joints 28 were formed in the same manner as in Example 11.

With cut-raised parts 34 inserted through through-holes 36, the cut-raised parts 34 were melted by TIG welding and resolidified to connect the electrode 32 and the electrode lead 30.

Of each of Examples 11 and 12, 100 electrode structures were produced. Using all the electrode structures, the electrical resistance between the electrode and the electrode lead was measured, and the average value for each of the Examples was calculated. Also, in order to examine the bonding strength between the electrode and the electrode lead, tensile strength was measured by pulling the electrode lead along the main surface of the electrode while securing the electrode, and the average value for each of the Examples was calculated. Also, the total thickness of the overlapping part of the electrode and the electrode lead was measured, and the average value for each of the Examples was calculated. Table 3 shows the above results.

TABLE 3

| | Electrical resistance (mΩ) | Tensile strength (n) | Total thickness (μm) |
|---|---|---|---|
| Example 11 | 2.7 | 32.3 | 188 |
| Example 12 | 2.9 | 32.1 | 188 |

As is clear from Table 3, in Examples 11 and 12 of Embodiment 3, the electrical resistance was slightly higher than those of the respective Examples of Embodiments 1 and 2, but the resistance value could be lowered to the practical range. Also, since the number of the joints 28 was increased, the tensile strength was also as high as the strength of other Examples.

Embodiment 4

Next, Embodiment 4 of the invention is described.

Figure 23:
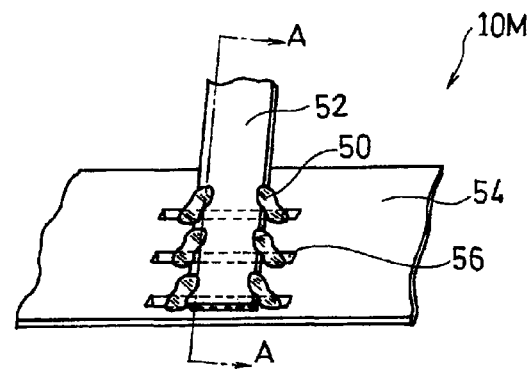
FIG. 23 is a perspective view schematically showing the structure of an electrode structure for a non-aqueous electrolyte secondary battery according to Embodiment 4 of the invention.
Figure 24:
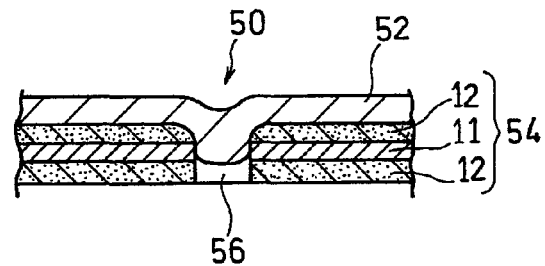
FIG. 24 is an enlarged cross-sectional view of the electrode structure for a non-aqueous electrolyte secondary battery.

FIG. 23 schematically shows the structure of an electrode structure for a non-aqueous electrolyte secondary battery according to Embodiment 4 of the invention. FIG. 24 shows a part of a cross-section along the line A-A of FIG. 23. In FIGS. 23 and 24, the same elements as those of Embodiments 1 to 3 are given the same reference characters, and the detailed descriptions thereof are omitted.

In an electrode structure 10M in the illustrated example, an electrode lead 52 and an electrode 54 are also joined by joints 50 at a middle area of the overlapping part of the electrode lead 52 and the electrode 54.

The electrode lead 52, which is shaped like a rectangular strip, is disposed so as to partially overlap the electrode 54 so that the longitudinal direction thereof is parallel to the width direction of the electrode 54.

The electrode 54 has a plurality of (three in the illustrated example) slit-like through-holes 56, which are parallel to the longitudinal direction of the electrode 54 and overlap the whole width of the electrode lead 52. The length of the through-holes 56 is greater than the width of the electrode lead 52. The ends of the electrode lead 52 in the width direction are melted, for example, by plasma welding, and the molten portion thereof partially flows into the through-holes 56 and resolidifies.

Also, while the current collector 11 and the electrode lead 52 are made of the same material or different materials, they are preferably made of a metal having very high bonding characteristics. Also, the molten portion of the electrode lead 52 having flowed into each through-hole 56 takes a spherical shape by surface tension at a position in contact with the current collector 11, and remains at that position. As a result, the joints 54 comprising the resolidified molten portion provides electrical continuity between the electrode lead 52 and the current collector 11, thereby ensuring that they are joined in a reliable manner.

Also, it is preferable to form the joints 54 alternately between the right and left sides of the electrode lead 52 in the width direction. In this case, the electrode 54 and the electrode lead 52 can be joined without distorting the electrode 54 in the longitudinal direction.

The method of melting the ends of the electrode lead 52 in the width direction is not limited to plasma welding, and other methods such as laser welding, TIG welding, and electron beam welding can be used.

Figure 25:
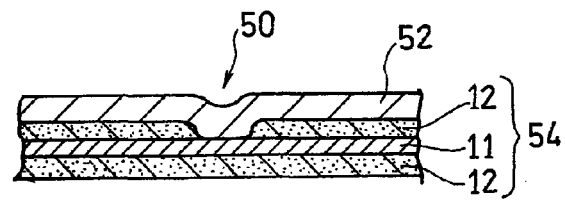
FIG. 25 is an enlarged cross-sectional view of a modified example of the electrode structure for a non-aqueous electrolyte secondary battery.

As illustrated in FIG. 25, the slit-like through-hole 56 may be replaced with a recess 79. The recess 79 is formed so as to expose the current collector 11 at the bottom thereof. In this case, also, the end of the electrode lead 52 in the width direction is melted, and the molten portion partially flows into the recess 79 and resolidifies to form the joint 50. When the recess 79 is formed instead of the through-hole 56, the molten portion formed by melting the end of the electrode lead 52 in the width direction accumulates more easily in the recess 79, and the current collector 11 and the electrode lead 52 can be brought into electrical continuity in a more reliable manner.

On the other hand, in the case of the through-hole 56, the cut section of the current collector 11 by a punch process or the like comes into direct contact with the molten portion of the end of the electrode lead 52 in the width direction. Thus, the metals are easily bonded and thus easily joined together.

As described above, in the electrode structure 10M of FIG. 23, the joints 50 join the electrode 54 and the electrode lead 52 so as to provide electrical continuity between the electrode lead 52 and the current collector 11 in the slit-like through-holes 56 or recesses 79 that are formed in the electrode 54 so as to intersect with the ends of the electrode lead 52 in the width direction. As such, the metals are integrated to ensure connection between the electrode lead 52 and the current collector 11. Therefore, the electrical resistance between the electrode 54 and the electrode lead 52 can be significantly reduced.

Also, since the slit-like through-holes 56 or recesses 79 are parallel to the longitudinal direction of the electrode 54, the position in the electrode 54 to which the electrode lead 52 is attached can be freely adjusted, although it is somewhat limited by the length of the through-holes 56 or recesses 79. Therefore, the electrode lead 52 can be easily attached to the electrode 54, and productivity improves.

Figure 26:
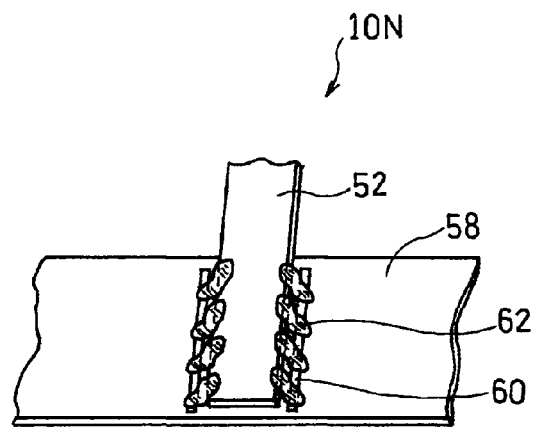
FIG. 26 is a perspective view showing another modified example of the electrode structure for a non-aqueous electrolyte secondary battery.

FIG. 26 shows a modified example of the electrode structure for a non-aqueous electrolyte secondary battery illustrated in FIG. 23. In an electrode structure 10N of this modified example, joints 62 are also formed in slit-like through-holes 60 (or "recesses"; hereinafter the same) in an electrode 58. However, in this modified example, the through-holes 60 are parallel to the width direction of the electrode 58 along both ends of the electrode lead 52.

In this way, when the through-holes 60 are made parallel to the width direction of the electrode 58, the joint area of the electrode 58 and the electrode lead 52 can be easily increased, and the bonding strength of the electrode 58 and the electrode lead 52 can be enhanced. Also, it is preferable to form the through-holes 60 at positions immediately adjacent to the side edges of the electrode lead 52, or so as to partially overlap the electrode lead 52. If the distance between the through-hole 60 and the electrode lead 52 is excessive, the molten portion may not flow into the through-hole 60. This can also occur when the through-hole 60 completely overlaps the electrode lead 52.

Figure 27:
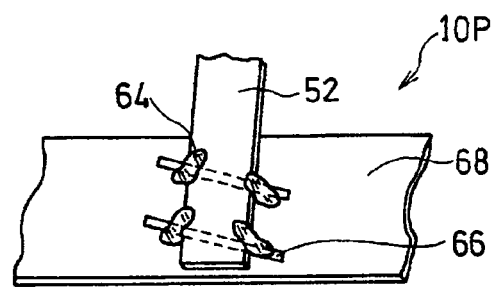
FIG. 27 is a perspective view showing still another modified example of the electrode structure for a non-aqueous electrolyte secondary battery.

FIG. 27 shows another modified example of the electrode structure. In an electrode structure 10p of this modified example, joints 64 are also formed in slit-like through-holes 66 (or "recesses"; hereinafter the same) formed in an electrode 68. However, in this modified example, the through-holes 66 are slanted relative to the width or longitudinal direction of the electrode 58.

In this way, since the through-holes 66 are made slantwise relative to the width direction of the electrode 58, even when the number of the through-holes 66 is small, the joints 64 can be disposed at suitable intervals over the whole width of the electrode 68. As a result, when the electrode 68 is wound or layered to form an electrode assembly, it is possible to suppress the occurrence of wrinkles etc. in the electrode 68 and the separator.

Also, even when there is a change in the width of the electrode 68 and the length of the electrode lead 52, if the slanting angle of the through-holes 66 is adjusted, the joints 64 can be disposed at suitable intervals over the whole width of the electrode 68 without increasing the number of the through-holes 66.

In the electrode structure 10p of FIG. 27, it is also preferable to form the joints 64 alternately between the right and left sides of the electrode lead 52 in the width direction.

Examples of Embodiment 4 are hereinafter described. The invention is not to be construed as being limited to these Examples.

Example 13

An electrode structure with the same structure as that illustrated in FIG. 23 was produced as follows. Herein, three recesses 79 as illustrated in FIG. 25 were formed on an electrode 54.

In the same manner as in Example 1, a negative electrode 54 was produced. The recesses 79, shaped like slits and parallel to the longitudinal direction of the electrode, were formed at predetermined positions of the electrode 54 in the longitudinal direction so that they were aligned at predetermined intervals (specifically 10 mm) in the width direction of the electrode. The recesses 79 were formed so as to expose a current collector 11 at the bottom thereof. The recesses 79 had a length of 5 mm.

A copper lead with a width of 4 mm and a thickness of 0.1 mm was used as an electrode lead 52.

The electrode lead 52 was placed on the electrode 54 so that its whole width overlapped the recesses 79, and then secured with a jig so that the electrode lead 52 closely adhered to the recesses 79. In this state, the portions of the ends of the electrode lead 52 in the width direction intersecting with the recesses 79 were melted by plasma welding to cause part of the molten portions to flow into the recesses 79, and then resolidified to join the electrode 54 and the electrode lead 52.

Example 14

An electrode structure with the same structure as that illustrated in FIG. 23 was produced as follows. Herein, three through-holes 56 as illustrated in FIG. 24 were formed in an electrode.

In the same manner as in Example 1, a negative electrode 54 was produced. The through-holes 56, shaped like slits and parallel to the longitudinal direction of the electrode, were formed at predetermined positions of the electrode 54 in the longitudinal direction so that they were aligned at predetermined intervals (specifically 10 mm) in the width direction of the electrode. The through-holes 56 had a length of 5 mm.

A copper lead with a width of 4 mm and a thickness of 0.1 mm was used as an electrode lead 52.

The electrode lead 52 was placed on the electrode 54 so that its whole width overlapped the through-holes 56, and then secured with a jig so that the electrode lead 52 closely adhered to the through-holes 56. In this state, the portions of the ends of the electrode lead 52 in the width direction intersecting with the through-holes 56 were melted by plasma welding to cause part of the molten portions to flow into the through-holes 56, and then resolidified to join the electrode 54 and the electrode lead 52.

Example 15

A positive electrode structure with the same structure as that illustrated in FIG. 23 was produced in the following manner. Recesses 79 as illustrated in FIG. 25 were formed in an electrode.

In the same manner as in Example 7, a positive electrode 54 was produced. Using the electrode 54 and an aluminum electrode lead 52, an electrode structure was produced in the same manner as in Example 13.

Of each of Examples 13 to 15, 100 electrode structures were produced. Using all the electrode structures, the electrical resistance between the electrode and the electrode lead was measured, and the average value for each of the Examples was calculated. Also, in order to examine the bonding strength between the electrode and the electrode lead, tensile strength was measured by pulling the electrode lead along the main surface of the electrode while securing the electrode, and the average value for each of the Examples was calculated. Table 4 shows the above results.

TABLE 4

|  | Electrical resistance (mΩ) | Tensile strength (N) |
|---|---|---|
| Example 13 | 0.7 | 35.7 |
| Example 14 | 0.8 | 42.5 |
| Example 15 | 0.7 | 35.5 |

As is clear from Table 4, in each of the Examples 13 to 15, the electrical resistance between the electrode 54 and the electrode lead 52 is small. This shows that the joints 50 could connect the electrode 54 and the electrode lead 52 so as to provide electrical continuity between the electrode lead 52 and the current collector 11 exposed in the through-holes 56 or recesses 79.

Next, non-aqueous electrolyte secondary batteries using the electrode structures of Embodiments 1 to 4 for non-aqueous electrolyte secondary batteries are described.

Figure 28:
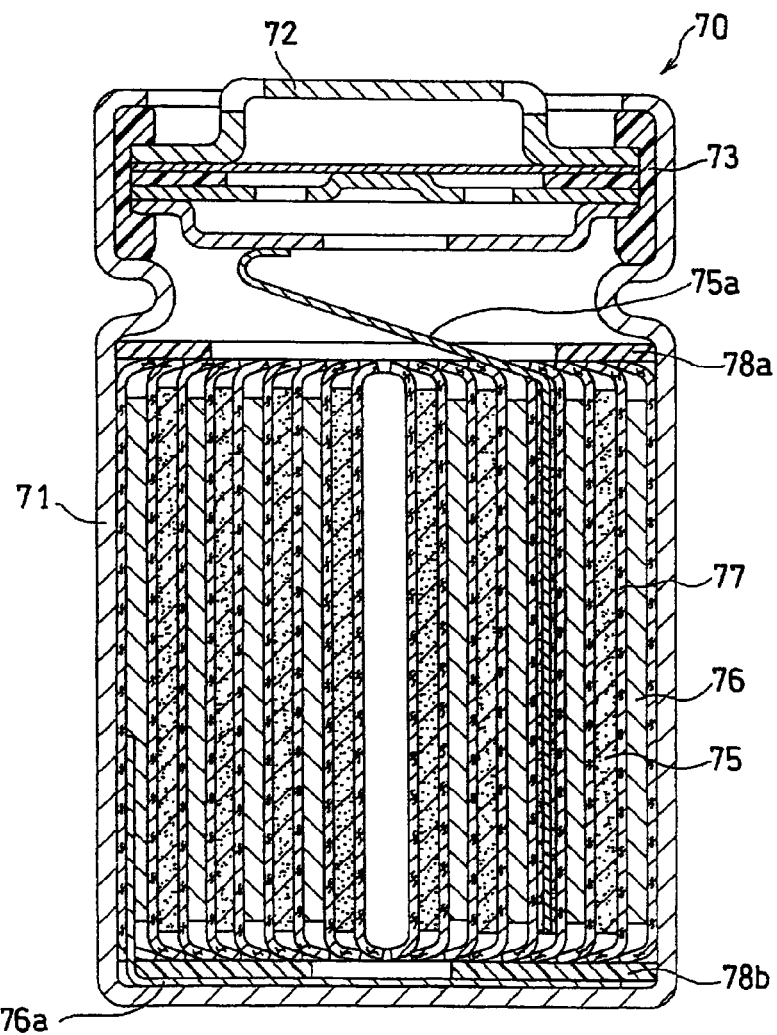
FIG. 28 is a cross-sectional view schematically showing the structure of a non-aqueous electrolyte secondary battery according to one embodiment of the invention.

FIG. 28 illustrates an example of such non-aqueous electrolyte secondary batteries. A secondary battery 70 in the illustrated example includes an electrode assembly 80 that is formed by spirally winding a positive electrode 75 and a negative electrode 76, with a separator 77 interposed therebetween. The positive electrode 75 has active material layers containing a lithium composite oxide as a positive electrode active material, while the negative electrode 76 has active material layers containing a material capable of retaining lithium as a negative electrode active material. Also, the positive electrode 75 is joined with a positive electrode lead 75a according to any one of Embodiments 1 to 4, while the negative electrode 76 is joined with a negative electrode lead 76a according to any one of Embodiments 1 to 4.

The electrode assembly 80 with upper and lower insulator plates 78a and 78b are placed in a cylindrical battery case 71 with a bottom. The negative electrode lead 76a drawn from the lower part of the electrode assembly 80 is connected to the bottom of the battery case 71. The positive electrode lead 75a drawn from the upper part of the electrode assembly 80 is connected to a seal member 72 for sealing the opening of the battery case 71. Also, a predetermined amount of a non-aqueous electrolyte (not shown) is injected into the battery case 71. The injection of the electrolyte is performed after the electrode assembly 80 is placed in the battery case 71. Upon completion of injection of the electrolyte, the seal member 72, around which a seal gasket 73 is fitted, is inserted into the opening of the battery case 71. The opening of the battery case 71 is then bent inward and crimped for sealing, to form the lithium ion secondary battery 70.

INDUSTRIAL APPLICABILITY

In the electrode structure of the invention, even when an active material is carried over two whole main surfaces of a current collector of an electrode, the current collector and an electrode lead can be joined with a small electrical resistance, and almost no active material needs to be removed from the surfaces of the current collector for joining them. It is therefore possible to realize a high capacity electrode and a non-aqueous electrolyte secondary battery suitable as the power source for high performance electronic devices or compact portable electronic devices.

| [Reference Signs List] | |
| --- | --- |
| 10 | Electrode structure |
| 11 | Current collector |
| 12 | Active material layer |
| 13, 32, 54, 58, 68 | Electrode |
| 14, 30, 40, 44, 52 | Electrode lead |
| 15, 28, 42, 46, 50, 62, 64 | Joint |
| 16 | Step |
| 18 | Crimped part |
| 20, 24 | Adhesive tape |
| 22, 26 | Adhesive |
| 34, 38, 48 | Cut-raised part |
| 36, 56, 60, 66 | Through-hole |
| 70 | Non-aqueous electrolyte secondary battery |
| 71 | Battery case |
| 72 | Seal member |
| 75 | Positive electrode |
| 75a | Positive electrode lead |
| 76 | Negative electrode |
| 76a | Negative electrode lead |
| 77 | Separator |
| 79 | Recess |
| 80 | Electrode assembly |

The invention claimed is:

1. An electrode structure for a non-aqueous electrolyte secondary battery, comprising:
   an electrode including a rectangular-shaped current collector with two main surfaces and an active material layer formed on each of the main surfaces of the current collector, the current collector comprising a metal foil and having an exposed part at one end along a long side of the electrode;
   an electrode lead; and
   a joint for joining the electrode and the electrode lead so as to provide electrical continuity between the exposed part and the electrode lead,
   wherein the electrode lead has a part overlapping the electrode and one end face which is disposed so as to be flush with an end face of the electrode at the one end along the long side, and
   the joint is formed so as to extend over the end face of the electrode at the one end and the one end face of the electrode lead.

2. The electrode structure for a non-aqueous electrolyte secondary battery in accordance with claim 1, further comprising an additional joint formed at the other end along another long side of the electrode.

3. The electrode structure for a non-aqueous electrolyte secondary battery in accordance with claim 2,
   wherein the electrode lead has a step that is formed so as to be flush with an end face of the electrode at the other end, and
   the joint formed at the other end joins the other end of the electrode and the step of the electrode lead.

4. The electrode structure for a non-aqueous electrolyte secondary battery in accordance with claim 1,
   wherein the electrode lead is affixed to the other end of the electrode with adhesive tape.

5. An electrode structure for a non-aqueous electrolyte secondary battery, comprising:
   an electrode including a rectangular-shaped current collector with two main surfaces and an active material layer formed on each of the main surfaces of the current collector, the current collector comprising a metal foil and having an exposed part at one end along a short side of the electrode;
   an electrode lead; and
   a joint for joining the electrode and the electrode lead so as to provide electrical continuity between the exposed part and the electrode lead,
   wherein the electrode lead has a part overlapping the electrode and one end face which is disposed so as to be flush with an end face of the electrode at the one end along the short side, and
   the joint is formed so as to extend over the end face of the electrode at the one end and the one end face of the electrode lead.

6. The electrode structure for a non-aqueous electrolyte secondary battery in accordance with claim 5,
   wherein the other end of the electrode lead is affixed to the electrode with adhesive tape.

7. A non-aqueous electrolyte secondary battery comprising:
   an electrode assembly comprising a positive electrode and a negative electrode which are wound or layered with a separator interposed therebetween, each of the positive and negative electrodes being rectangular-shaped;
   an electrode lead joined to the positive electrode and an electrode lead joined to the negative electrode;
   a non-aqueous electrolyte;
   a battery case housing the electrode assembly and the non-aqueous electrolyte; and
   a seal member sealing an opening of the battery case,
   wherein at least one of an electrode structure comprising the electrode lead joined to the positive electrode and an electrode structure comprising the electrode lead joined to the negative electrode is the electrode structure of claim 1 for a non-aqueous electrolyte secondary battery.

* * * * *